US009811303B2

(12) United States Patent
Choi

(10) Patent No.: US 9,811,303 B2
(45) Date of Patent: Nov. 7, 2017

(54) DISPLAY APPARATUS, MULTI DISPLAY SYSTEM INCLUDING THE SAME, AND CONTROL METHOD THEREOF

(71) Applicant: SAMSUNG ELECTRONICS CO., LTD., Suwon-si (KR)

(72) Inventor: Hyun-mook Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 192 days.

(21) Appl. No.: 14/797,375

(22) Filed: Jul. 13, 2015

(65) Prior Publication Data

US 2016/0034239 A1    Feb. 4, 2016

(30) Foreign Application Priority Data

Aug. 1, 2014    (KR) .................. 10-2014-0098944

(51) Int. Cl.
*G06F 3/14*      (2006.01)
*G06F 3/0482*    (2013.01)
*G06F 3/0484*    (2013.01)

(52) U.S. Cl.
CPC .......... *G06F 3/1423* (2013.01); *G06F 3/0482* (2013.01); *G06F 3/04845* (2013.01); *G06F 3/1446* (2013.01); *G09G 2340/125* (2013.01)

(58) Field of Classification Search
CPC ... G06F 3/1423; G06F 3/0482; G06F 3/04845
See application file for complete search history.

(56) References Cited

U.S. PATENT DOCUMENTS

2005/0253774 A1*  11/2005  Choi ................... G06F 3/1423
                                                          345/1.1
2007/0057866 A1*  3/2007  Lee .................... H04M 1/0218
                                                          345/1.1
2008/0055475 A1*  3/2008  Park .................. H04N 5/44591
                                                          348/588
2010/0321569 A1    12/2010  Kim

* cited by examiner

*Primary Examiner* — Shaheda Abdin
(74) *Attorney, Agent, or Firm* — Sughrue Mion, PLLC

(57) ABSTRACT

A display apparatus, a multi display system including the same, and a control method thereof are provided. The display apparatus includes a display configured to display a first image corresponding to a first image signal on a main screen, and a second image corresponding to a second image signal on a picture in picture (PIP) screen overlapping an area of the main screen. The display apparatus further includes a communication interface configured to transmit and receive information of a movement of the PIP screen to and from another display apparatus, and a controller configured to control the display to move the PIP screen based on the information.

40 Claims, 10 Drawing Sheets

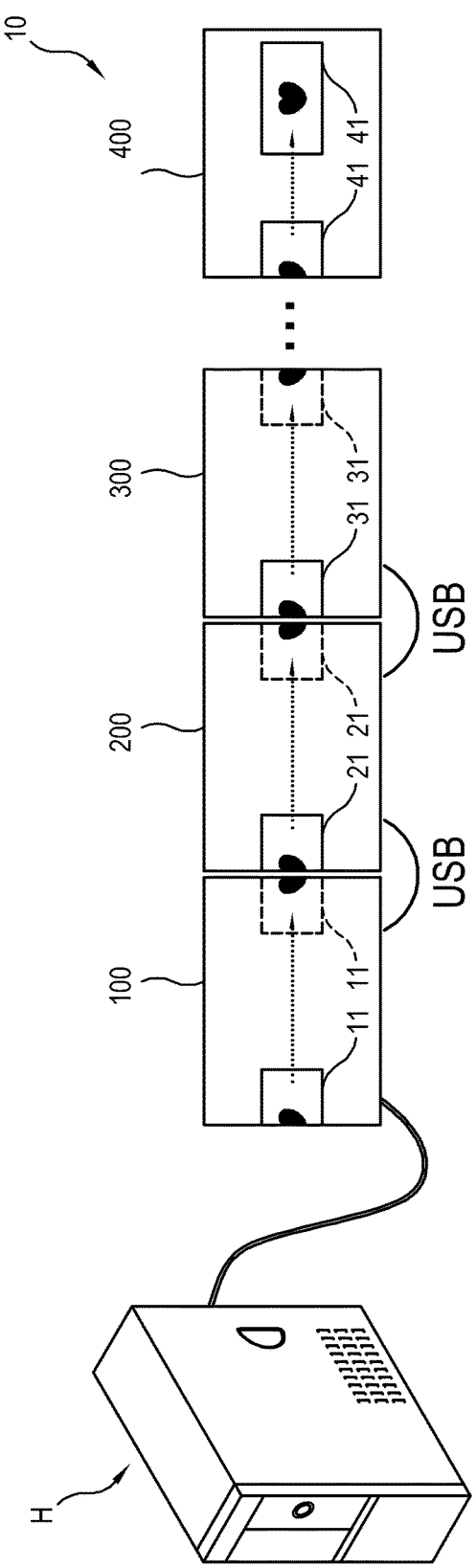

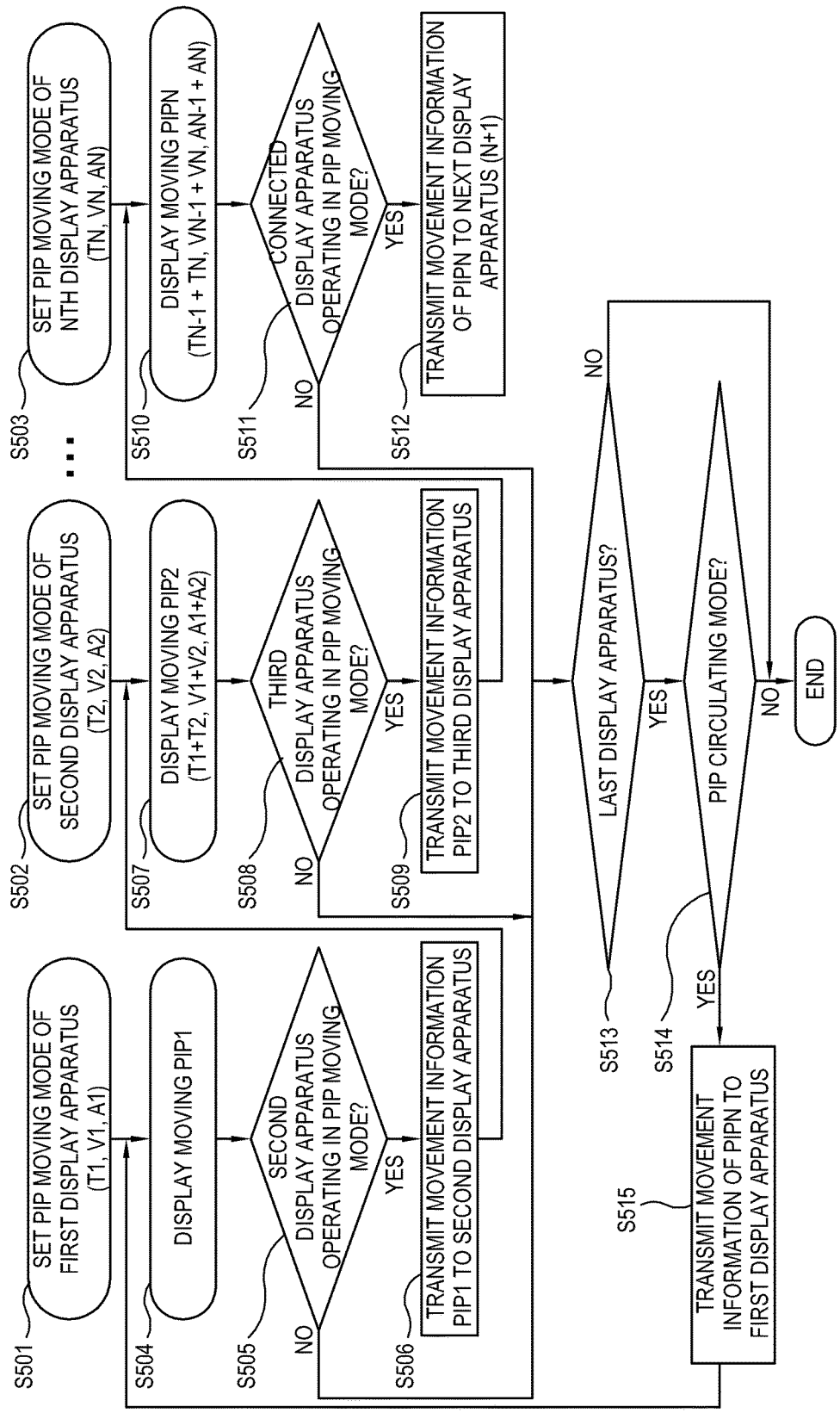

DISPLAY APPARATUS, MULTI DISPLAY SYSTEM INCLUDING THE SAME, AND CONTROL METHOD THEREOF

CROSS-REFERENCE TO RELATED APPLICATION

This application claims priority from Korean Patent Application No. 10-2014-0098944, filed on Aug. 1, 2014, in the Korean Intellectual Property Office, the disclosure of which is incorporated herein by reference in its entirety.

BACKGROUND

Field

Apparatuses and methods consistent with the exemplary embodiments relate to a display apparatus, a multi display system including the same, and a control method thereof.

Description of the Related Art

A display apparatus receives an image signal from an image source and processes the received image signal to be displayed as an image. The display apparatus processes and displays various contents such as a moving image of digital data, a still image (a picture), a game application, etc., as well as a broadcasting signal transmitted from a broadcasting station.

The display apparatus may support a picture in picture (PIP) function that a plurality of image signals are all displayed as on one screen to thereby consult a user's convenience. In the PIP function, the plurality of image signals are respectively received and processed to be displayed on a main screen and a sub screen. If a user executes the PIP function while viewing the main screen, an image of the sub screen is displayed overlapping with a certain area of an image displayed on the main screen. Thus, a user can view both an image displayed on the main screen and an image displayed on the sub screen, which is different in channel from the image displayed on the main screen or based on an image signal received from the exterior.

In general, such a conventional PIP function displays a PIP screen corresponding to the sub screen at a certain fixed position, for example, a right upper position of the display apparatus. Although a user can select the position for the PIP screen among a right upper position, a right lower position, a left lower position, etc., the sub screen displaying the PIP screen is fixed at the selected position if the position is selected once.

SUMMARY

Exemplary embodiments address at least the above problems and/or disadvantages and other disadvantages not described above. Also, the exemplary embodiments are not required to overcome the disadvantages described above, and may not overcome any of the problems described above.

According to an aspect of an exemplary embodiment, there is provided a display apparatus including a display configured to display a first image corresponding to a first image signal on a main screen, and a second image corresponding to a second image signal on a picture in picture (PIP) screen overlapping an area of the main screen. The display apparatus further includes a communication interface configured to transmit and receive information of a movement of the PIP screen to and from another display apparatus, and a controller configured to control the display to move the PIP screen based on the information.

The controller may be further configured to control the display to move PIP screen based on the information received from the other display apparatus.

The information may include at least one among a velocity, a direction, and an angle of the movement of the PIP screen.

The communication interface may be further configured to transmit and receive information of the second image to and from the other display apparatus.

The display apparatus may further include a user interface configured to receive a selection of a PIP moving mode, and the controller may be further configured to control the display so that the PIP screen appears, moves, and disappears based on settings for the selected PIP moving mode.

The controller may be further configured to control the display to display a menu for setting the settings, and the user interface may be further configured to receive the settings.

The controller may be further configured to determine whether the other display apparatus operates in the PIP moving mode, and the communication interface may be further configured to transmit the information to the other display apparatus in response to the controller determining that the other display apparatus operates in the PIP moving mode.

The communication interface may be further configured to transmit and receive the first image signal and the second image signal to and from the other display apparatus.

The controller may be further configured to control the display to move the PIP screen based on the information and/or settings for the movement of the PIP screen.

The display apparatus may be connected in series to the other display apparatus.

According to an aspect of another exemplary embodiment, there is provided a multi display system including a first display apparatus, and a second display apparatus connected in series to the first display apparatus. The first display apparatus includes a first display configured to display a first image corresponding to a first image signal on a first main screen, and a second image corresponding to a second image signal on a first picture in picture (PIP) screen overlapping an area of the first main screen, a first communication interface configured to transmit information of a movement of the first PIP screen to the second display apparatus, and a first controller configured to control the first display to move the first PIP screen based on the information. The second display apparatus includes a second display configured to display a third image on a second main screen, and a fourth image on a second PIP screen overlapping an area of the second main screen, a second communication interface configured to receive the information from the first display apparatus, and a second controller configured to control the second display to move the second PIP screen based on the information.

The multi display system may further include a third display apparatus connected in series to the second display apparatus, and the second communication interface may be further configured to transmit information of a movement of the second PIP screen to the third display apparatus.

The third display apparatus may include a third display configured to display a fifth image on a third main screen, and a sixth image on a third PIP screen overlapping an area of the third main screen, a third controller configured to determine whether the third display apparatus is a last display apparatus of the multi display system, and a third communication interface configured to transmit information of a movement of the third PIP screen to the first display apparatus in response to the third controller determining that the third display apparatus is the last display apparatus.

The information of the movement of the second PIP screen may include at least one among a velocity, a direction, and an angle of the movement of the second PIP screen.

The second communication interface may be further configured to transmit information of the fourth image to the third display apparatus.

The second communication interface may be further configured to receive information of the second image from the first display apparatus, and the second controller may be further configured to control the second display to display the fourth image in succession to the second image based on the information of the second image.

The first controller may be further configured to determine whether the second display apparatus operates in a PIP moving mode, and the first communication interface may be further configured to transmit the information to the second display apparatus in response to the first controller determining that the second display apparatus operates in the PIP moving mode.

The first communication interface may be further configured to transmit the first image signal and the second image signal to the second display apparatus, and the second display may be further configured to display the third image corresponding to the first image signal and the fourth image corresponding to the second image signal.

According to an aspect of another exemplary embodiment, there is provided a method of controlling a first display apparatus, the method including displaying a first image corresponding to a first image signal on a main screen, and a second image corresponding to a second image signal on a picture in picture (PIP) screen overlapping an area of the main screen. The method further includes transmitting information of a movement of the PIP screen to a second display apparatus, and moving the PIP screen based on the information.

The method may further include receiving other information of a movement of another PIP screen from a third display apparatus connected in series to the first display apparatus. The moving may include moving the PIP screen based on the information and the other information.

The other information may include at least one among a velocity, a direction, and an angle of the movement of the other PIP screen.

The method according may further include receiving information of another image of the other PIP screen from the third display apparatus.

The method may further include receiving a selection of a PIP moving mode, and displaying the PIP screen so that the PIP screen appears, moves, and disappears based on settings for the selected PIP moving mode.

The method may further include displaying a menu for setting the settings, and receiving the settings.

The method may further include determining whether the second display apparatus operates in the PIP moving mode, and the transmitting may include transmitting the information to the second display apparatus in response to the determining that the second display apparatus operates in the PIP moving mode.

The method may further include transmitting the first image signal and the second image signal to the second display apparatus.

The method may further include receiving the first image signal and the second image signal from the third display apparatus.

According to an aspect of another exemplary embodiment, there is provided a method of controlling a multi display system including a first display apparatus, and a second display apparatus connected in series to the first display apparatus. The method includes displaying, by the first display apparatus, a first image corresponding to a first image signal on a first main screen, and a second image corresponding to a second image signal on a first picture in picture (PIP) screen overlapping an area of the first main screen, transmitting, by the first display apparatus, information of a movement of the first PIP screen to the second display apparatus, and moving, by the first display apparatus, the first PIP screen based on the information. The method further includes displaying, by the second display apparatus, a third image on a second main screen, and a fourth image on a second PIP screen overlapping an area of the second main screen, receiving, by the second display apparatus, the information from the first display apparatus, and moving, by the second display apparatus, the second PIP screen based on the information.

The method may further include transmitting, by the second display apparatus, information of a movement of the second PIP screen to a third display apparatus connected in series to the second display apparatus.

The method may further include displaying, by the third display apparatus, a fifth image on a third main screen, and a sixth image on a third PIP screen overlapping an area of the third main screen, determining, by the third display apparatus, whether the third display apparatus is a last display apparatus of the multi display system, and transmitting, by the third display apparatus, information of a movement of the third PIP screen to the first display apparatus in response to the determining that the third display apparatus is the last display apparatus.

The method may further include transmitting, by the second display apparatus, information of the fourth image to the third display apparatus.

The method may further include receiving, by the second display apparatus, information of the second image from the first display apparatus, and the displaying, by the second display apparatus, may include displaying, by the second display apparatus, the fourth image in succession to the second image based on the information of the second image.

The method may further include determining, by the first display apparatus, whether the second display apparatus operates in a PIP moving mode, and the transmitting, by the first display apparatus, may include transmitting, by the first display apparatus, the information to the second display apparatus in response to the determining that the second display apparatus operates in the PIP moving mode.

The method may further include transmitting, by the first display apparatus, the first image signal and the second image signal to the second display apparatus, and the displaying, by the second display apparatus, may include displaying, by the second display apparatus, the third image corresponding to the first image signal and the fourth image corresponding to the second image signal.

The displaying, by the second display apparatus, may include displaying, by the second display apparatus, the third image corresponding to a third image signal and the fourth image corresponding to a fourth image signal.

The moving, by the second display apparatus, may include moving, by the second display apparatus, the second PIP screen based on the information and settings for a movement of the second PIP screen.

The method may further include determining, by the second display apparatus, whether the second display apparatus is a last display apparatus of the multi display system, determining, by the second display apparatus, whether the multi display system is in a PIP circulating mode, in response to the determining that the second display apparatus is the last display apparatus, and transmitting, by the second display apparatus, information of a movement of the second PIP screen to the first display apparatus in response to the determining that the multi display system is in the PIP circulating mode.

BRIEF DESCRIPTION OF THE DRAWINGS

The above and/or other aspects will be more apparent by describing certain exemplary embodiments with reference to the accompanying drawings in which:

FIG. 9 is a diagram of a multi display system additionally including a host apparatus according to an exemplary embodiment; and FIG. 10 is a flowchart of a control method of a multi display system according to an exemplary embodiment.

DETAILED DESCRIPTION OF THE EXEMPLARY EMBODIMENTS

Figure 1:
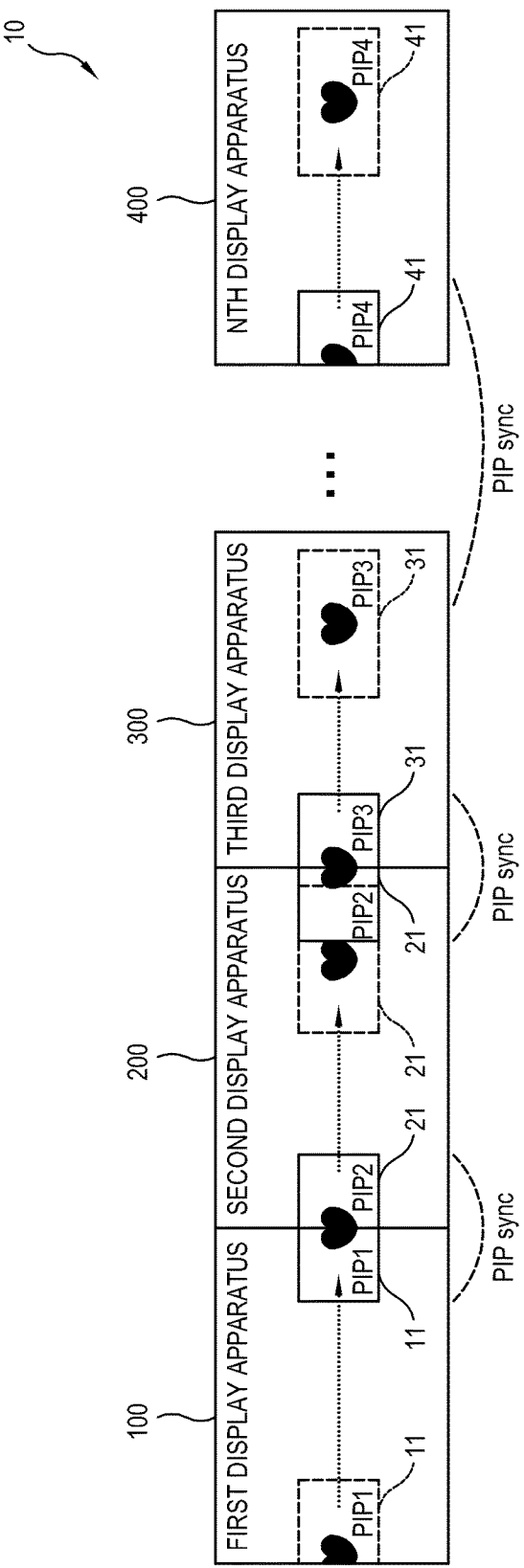
FIG. 1 is a diagram of a multi display system according to an exemplary embodiment.

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

In addition, the terms such as "unit," "-er (-or)," and "module" described in the specification refer to an element for performing at least one function or operation, and may be implemented in hardware, software, or the combination of hardware and software.

FIG. 1 is a diagram of a multi display system according to an exemplary embodiment.

A multi display system 10 according to this exemplary embodiment includes a plurality of display apparatuses 100, 200, 300, . . . , and 400 as shown in FIG. 1. Each of the display apparatuses 100, 200, 300 and 400 may be achieved by a TV and the like image processing apparatus that processes an image signal.

The display apparatuses 100, 200, 300 and 400 process an image signal from at least one external image source (for example, 101 and 102 of FIG. 2) to be displayed as an image on a display (for example, 130 of FIG. 2) in accordance with a preset image processing process.

This exemplary embodiment illustrates the plurality of display apparatuses 100, 200, 300 and 400 are sequentially connected in series, i.e., connected in a daisy chain to form a video wall. That is, the second display apparatus 200 is connected in series to the first display apparatus 100 and receives data from the first display apparatus 100, and the third display apparatus 300 is connected in series to the second display apparatus 200 and receives data from the second display apparatus 200. In such a manner, the first to nth display apparatuses 100 to 400 are sequentially connected in series.

Further, image signals transmitted from the image sources 101 and 102 to the first display apparatus 100 are transmitted to the final nth display apparatus 400 via the second display apparatus 200, the third display apparatus 300, and so on in sequence.

In addition, the display apparatuses 100, 200, 300 and 400 of the multi display system 10 may receive image signals from independent image sources, respectively. For example, like an exemplary embodiment shown in FIG. 7, the first display apparatus 100 may receive image signals from the first and second image sources 101 and 102, and the second display apparatus 200 may receive image signals from third and fourth image sources 201 and 202. The second and fourth image sources 102 and 202 may provide an image signal corresponding to one image displayed as the PIP screen.

A group is set to include two or more (e.g., the second and third display apparatuses) among the plurality of display apparatuses 100, 200, 300 and 400, and display apparatuses that belong to a group may be set to receive an image signal from one image source.

The present exemplary embodiment illustrates that the respective display apparatuses 100, 200, 300 and 400 are achieved by televisions (TV) displaying broadcasting images based on a broadcasting signal/broadcasting information/broadcasting data received from a transmitter of a broadcasting station. However, the kind of images displayable by the display apparatus is not limited to the broadcasting image. For example, the display apparatuses 100, 200, 300 and 400 may display a moving image, a still image, an application, on-screen display, a user interface (UI, hereinafter also referred to as a graphic user interface (GUI)) for controlling various operations, and the like image based on a signal/data received from various image sources 101 and 102.

According to an exemplary embodiment, each of the display apparatuses 100, 200, 300 and 400 may be achieved by a smart TV or Internet protocol (IP) TV. The Smart TV can receive and display a broadcasting signal in real time, and has a web-browsing function so that various contents can be searched and consumed through Internet while displaying the broadcasting signal in real time. To this end, the Smart TV can provide a convenient user environment. Further, the Smart TV has an open software platform to thereby provide an interactive service to a user. Therefore, the Smart TV can provide a user with various contents, e.g., an application for a predetermined service through the open software platform. Such an application is an application program capable of offering various kinds of service, and for example includes applications for social network service (SNS), finance, news, weather, a map, music, a movie, a game, an electronic book, and the like service.

Alternatively, an exemplary embodiment may be applied to a display apparatus different from the foregoing display apparatus, and may be for example applied when the display apparatuses 100, 200, 300 and 400 are monitors or the like connected to computers.

The display apparatuses 100, 200, 300 and 400 included in the display system 10 according to an exemplary embodiment can perform wired/wireless communication among them. In this case, the first display apparatus 100 to the final nth display apparatuses 400 may be sequentially connected in series by a universal serial bus (USB) or the like data line.

Each of the display apparatuses 100, 200, 300 and 400 according to an exemplary embodiment supports a picture in picture (PIP) function of receiving and processing a plurality of image signals to be displayed on a main screen and a sub screen. In response to execution of the PIP function, each of the display apparatuses 100, 200, 300 and 400 displays a PIP screen 11, 21, 31, and 41, respectively, corresponding to the sub screen overlapping with an area of an image displayed on the main screen. Each of the display apparatuses 100, 200, 300 and 400 may implement the PIP function in response to a user's control through a user interface (e.g., 140 of FIG. 2) such as a remote controller.

In the display apparatuses 100, 200, 300 and 400 according to an exemplary embodiment, the PIP screens 11, 21, 31 and 41 may be displayed moving in a preset direction and velocity. As shown in FIG. 1, the PIP screens 11, 21, 31 and 41 are successively moved and displayed among the respective display apparatuses 100, 200, 300 and 400 connected in sequence, and their images are also reproduced in succession to an image of the previous PIP screen. For example, the second PIP screen 21 moves in succession to the first PIP screen 11, and the third PIP screen 31 moves in succession to the second PIP screen 21. Further, the image of the second PIP screen 21 is reproduced in succession to the image of the first PIP screen 11, and the image of the third PIP screen 31 is reproduced in succession to the image of the second PIP screen 21.

To this end, in the multi display system 10 according to an exemplary embodiment, movement information of the PIP screen (e.g., information about a velocity, direction and angle of a moving PIP screen) and reproduction information of an image displayed on the PIP screen (e.g., information about reproduction timing)) is sent to the next serially-connected display apparatus, and thus PIP synchronization (hereinafter also referred to as PIP sync) is performed among the display apparatuses 100, 200, 300 and 400. That is, the PIP synchronization is implemented in such a manner that the PIP movement information is exchanged between the adjacent display apparatuses.

In the foregoing exemplary embodiment, the movement information of the PIP screen is shared among the plurality of display apparatuses 100, 200, 300 and 400. Thus, the PIP screens 11, 21, 31 and 41 are successively moved reproducing their images on the whole display formed by the plurality of display apparatuses 100, 200, 300 and 400 that constitute a video wall, and therefore the images displayed on the PIP screens 11, 21, 31 and 41 are utilizable for an advertisement image or the like that needs to attract attention.

In the following exemplary embodiments as well as that shown in FIG. 1, the display apparatuses 100, 200, 300 and 400 of the multi display system 10 are serially connected in a horizontal direction, and the PIP screens 11, 21, 31 and 41 are thus moved from left to right. However, without limitation, the display apparatuses 100, 200, 300 and 400 may alternatively be serially connected in a vertical direction so that the PIP screens 11, 21, 31 and 41 can move up and down. Alternatively, the display apparatuses may be arranged in a matrix of 2×2, 3×3 and so on, so that the PIP screens 11, 21, 31 and 41 can be successively moved in clockwise or counterclockwise.

In other words, the following exemplary embodiments are just examples that can be variously modified depending on the materializations of the systems without limitation.

Below, the first display apparatus 100 of the display system 10 according to an exemplary embodiment will be described with reference to FIG. 2.

Figure 2:
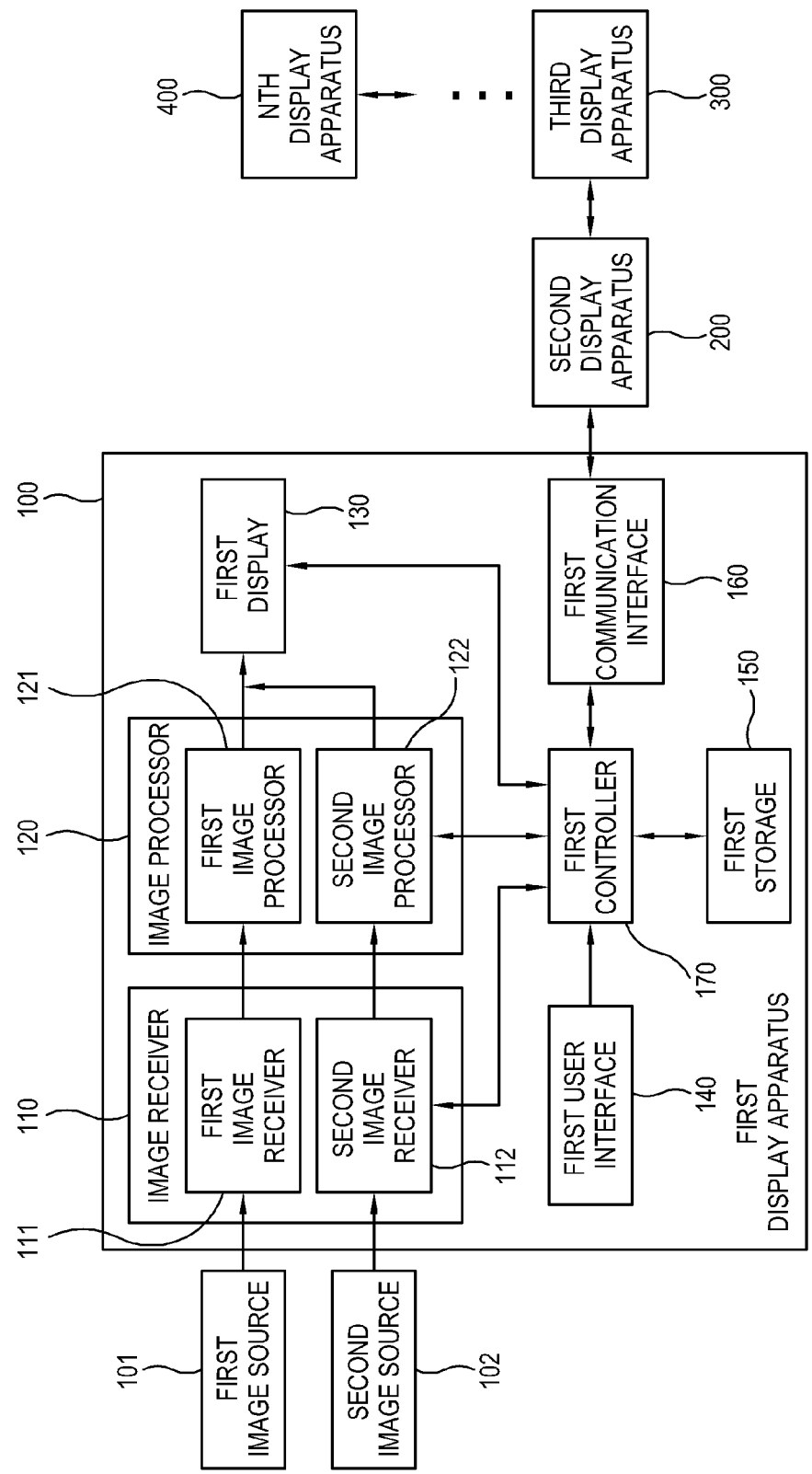
FIG. 2 is a block diagram of a display apparatus according to an exemplary embodiment.

FIG. 2 is a block diagram of a display apparatus according to an exemplary embodiment.

As shown in FIG. 2, the first display apparatus 100 according to an exemplary embodiment includes first and second image receivers 111 and 112 configured to receive image signals from the exterior, and first and second image processors 121 and 122 configured to respectively process the first and second image signals received from the first and second image receivers 111 and 112. The display apparatus 100 further includes a first display 130 configured to display the first and second image signals processed by the first and second image processors 121 and 122 as first and second images, respectively, and a first user interface 140 configured to receive a user's input. The display apparatus 100 further includes a first storage 150 configured to store various pieces of data, and a first communication interface 160 configured to perform wired/wireless communication with the exterior. The display apparatus 100 further includes a first controller 170 configured to control the first display apparatus 100.

As shown in FIG. 2, an image receiver 110 of the first display apparatus 100 according to an exemplary embodiment includes the two image receivers 111 and 112, and an image processor 120 of the first display apparatus 100 also includes the two image processors 121 and 122.

The first and second image receivers 111 and 112 may be achieved variously in accordance with the formats of the image signal and the types of the display apparatus 100. For example, the first and second image receivers 111 and 112 may wirelessly receive a radio frequency (RF) signal from a broadcasting station, or may receive the image signal based on composite video, component video, super video, Syndicat des Constructeurs d'Appareils Radiorécepteurs et Téléviseurs (SCART), high definition multimedia interface (HDMI) or the like standards through a wire. If the image signal is a broadcasting signal, the first and second image receivers 111 and 112 may include tuners for selecting a channel to receive the broadcasting signal.

An image signal may be received from an external device. For example, an image signal may be received an external device such as a personal computer, an audio/video (AV) device, a smart phone, a tablet PC or the like smart pad. An image signal may be caused by data received through a network such as Internet or the like. In this case, the display apparatus 100 may perform network communication through the first communication interface 160 such as a wired or wireless local area network (LAN). Further, In addition, an image signal may be caused by data stored in a flash memory, a hard disk or the like nonvolatile first storage 150. The first storage 150 may be provided inside or outside the display apparatus 100. In the case where the first storage 150 is provided outside the display apparatus 100, the display apparatus 100 may further include a connector for connecting with the first storage 150.

According to an exemplary embodiment, the first image receiver 111 receives a first image signal corresponding to a first image to be displayed as a main screen on the first display 130, and the second image receiver 112 receives a second image signal corresponding to a second image to be displayed as a sub screen, i.e., the first PIP screen 11. A first image source 101 supplying the first image signal may be regarded as a main source, and a second image source 102 supplying the second image signal may be regarded as an auxiliary source or a PIP source.

For example, if the first and second image receivers 111 and 112 include the tuners, the first image receiver 111 includes the tuner for receiving a broadcasting signal (i.e., the first image signal) of a channel tuned corresponding to the main screen, and the second image receiver 112 includes the tuner for receiving a broadcasting signal (i.e., the second image signal) of a channel tuned corresponding to the sub screen. The first and second image receivers 111 and 112 of the display apparatus 100 according to an exemplary embodiment are independent of each other and individually tuned to a plurality of channels corresponding to the images to be respectively displayed as the main screen and the sub screen.

The first and second image processors 121 and 122 perform various image processing processes previously set to the image signal. In this exemplary embodiment, the first and second image processors 121 and 122 individually process the first image signal received in the first image receiver 111, and the second image signal received in the second image receiver 112, respectively.

The first image processor 121 outputs the first image signal processed by the image processing process to the first display 130, so that a first image (i.e., video 1) corresponding to the first image signal can be displayed on the main screen of the first display 130.

Likewise, the second image processor 122 outputs the second image signal processed by the image processing process to the first display 130, so that a second image (i.e., video 2) corresponding to the second image signal can be displayed on a sub screen, i.e., the first PIP screen 11 of the first display 130.

The kind of imaging processes performed by the first and second image processors 121 and 122 may, for example, include decoding corresponding to various image formats, de-interlacing, frame refresh rate conversion, scaling, noise reduction for improving image quality, detail enhancement, line scanning, etc. without limitation. The first and second image processors 121 and 122 may be achieved by an individual module for independently performing each of the processes, or may be achieved by an image processing integrated chip (IC) in the form of a system-on-chip (SoC) where various functions corresponding to such processes are integrated.

In the foregoing exemplary embodiment shown in FIG. 2, the first and second image receivers 111 and 112 of the first display apparatus 100 respectively receive the first and second image signals, and the first and second image processors 121 and 122 respectively process the first and second received image signals. However, without limitation, the first and second image receivers 111 and 112 and the first and second image processors 121 and 122 may be not physically separated from each other. For example, a single image receiver may receive a plurality of image signals, and the plurality of received image signals may be individually processed by a single image processor.

The first display 130 displays first and second images based on first and second image signals processed by the first and second image processors 121 and 122. The first image is displayed as the main screen, and the second image is displayed as the sub screen, i.e., the first PIP screen 11 having a preset size and overlapping with the first image by at least a partial area.

In this exemplary embodiment, the PIP screen 11 may be displayed moving in a preset velocity and a preset direction on the first display 130 in response to a user's input of selecting a PIP moving mode to be described later. In this regard, descriptions will be given in more detail with reference to FIG. 3 and FIG. 4.

The first display 130 may for example be achieved by liquid crystal, plasma, a light emitting diode (LED), an organic light-emitting diode (OLED), a surface-conduction electron-emitter, a carbon nano-tube (CNT), nano-crystal, or the like, without limitation.

The first display 130 may include additional elements in accordance with its types. For example, if the first display 130 is achieved by the liquid crystal, the first display 130 includes a liquid crystal display (LCD) panel, a backlight unit for supplying light, and a panel driver for driving the panel.

The first display 130 may display an object (e.g., a menu, a text, an image, a video, a figure, an icon and a shortcut icon) including a menu item of the first display apparatus 100 as an on-screen display (OSD) or a user interface (UI). According to an exemplary embodiment, the first display apparatus 100 may generate an OSD for selecting and/or setting the PIP moving mode for moving the PIP screen 11 in a predetermined velocity and a predetermined direction, and display the OSD on the first display 130.

According to an exemplary embodiment, the first display 130 may include a touch screen for receiving input corresponding to a user's touch. The touch screen may be for example achieved by a resistive type, a capacitive type, an infrared type or an acoustic wave type. A user touches the object displayed on the touch screen with his/her body (e.g., a finger) or a separate pointing device such as a stylus, thereby performing his/her input. In this exemplary embodiment, the touch input includes drag, flick, drag & drop, tap, long tap, etc.

The touch screen may provide a user with a UI or OSD corresponding to various services (e.g., a phone call, data transmission, broadcasting, photographing, a moving picture or application). The touch screen sends the first controller 170 an analog signal corresponding to a single or multi touch input corresponding to selection on the UI or OSD.

According to an exemplary embodiment, the touch is not limited to the contact between the touch screen and a user's body or the pointing device, and may include noncontact touch (for example, hovering performed at a detectable distance of 30 mm or less between the touch screen and a user's body or between the touch screen and the pointing device. It will be appreciated by those skilled in the art that the contactless detectable distance of the touch screen may be varied depending on the performances or structures of the display apparatuses 100, 200, 300 and 400.

The first user interface 140 transmits various preset control commands or unlimited information to the first controller 170 in response to a user's control or input.

In this exemplary embodiment, the first user interface 140 may include a keypad (or an input panel) with numeral keys, menu keys or the like buttons provided in a main body of the first display apparatus 100; a remote controller that generates a preset command/data/information/signal for remotely controlling the TV and transmits it to the first display apparatus 100; a keyboard; a mouse; or the like peripheral input device separated from the main body. The remote controller may further include a touch sensor for sensing a user's touch and a motion sensor for sensing its own motion caused by a user.

The input device is an external device capable of wirelessly communicating with the main body of the first display apparatus 100, and the wireless communication includes infrared communication, radio frequency (RF) communication, wireless local area network (LAN), Wi-Fi direct, etc. The input device is controlled by a user and thus transmits a preset command to the first display apparatus 100.

The keypad includes a physical keypad formed in front and/or lateral sides of the first display apparatus 100, a virtual keypad displayed within the first display 130, and a wirelessly connectable physical keypad. It will be easily appreciated by those skilled in the art that the physical keypad formed in front and/or lateral sides of the first display apparatus 100 may be excluded in accordance with the performance or structure of the first display apparatus 100.

A user may control the first user interface 140 to set the PIP moving mode. In detail, the first display 130 displays an OSD showing menu items for settings of the PIP moving mode, and a user sets position information about the velocity, direction, angle, etc. of the PIP screen 11 and information about reproduction of the second image to be displayed on the PIP screen 11 through the OSD.

The menu items displayed as the OSD may be achieved in various forms. For example, the OSD may show various menu items for selecting starting and ending positions, a moving path, a moving velocity, etc. of the PIP screen 11 and an animation effect applicable when the PIP screen 11 appears/moves/disappears. The PIP screen 11 may be set to move by preset default settings in response to the selection of the PIP moving mode.

A user may control the first user interface 140 so that the first display apparatus 100 can enter the PIP moving mode. In response to a user's selection, the first controller 170 controls the first PIP screen 11 to appear, move, and disappear on the first display 130 in accordance with preset settings for the PIP moving mode.

Figure 3:
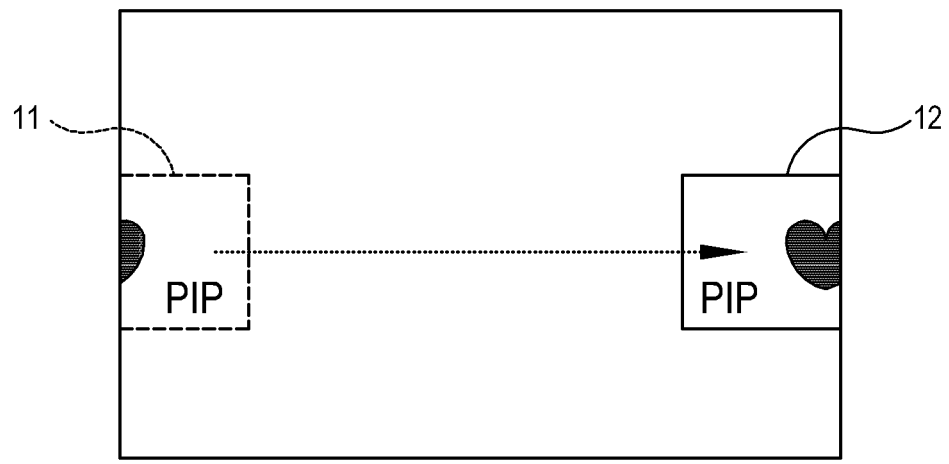
FIGS. 3 and 4 are diagrams of a PIP screen that is moved according to exemplary embodiments.
Figure 4:
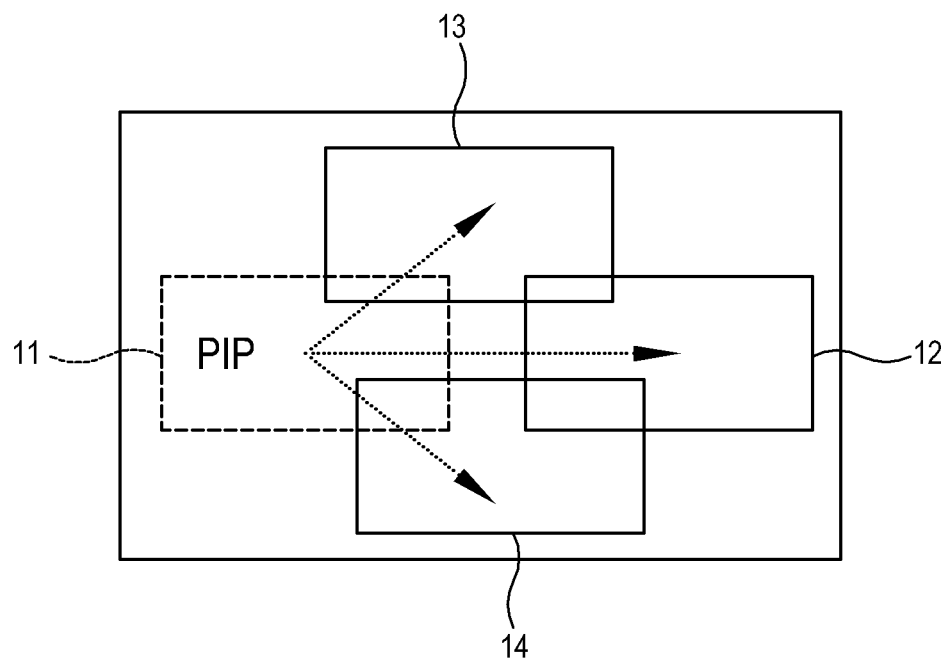

FIGS. 3 and 4 are diagrams of a PIP screen that is moved according to exemplary embodiments.

In the PIP moving mode, the first PIP screen 11 on the first display 130 is displayed moving in a preset velocity and/or direction. For example, as shown in FIG. 3, the first PIP screen 11 moves from a left side 11 to a right side 12. In detail, the PIP screen 11 appears at the left side 11, moves along a moving path as shown in FIG. 3, and disappears at the right side 12.

The PIP screen may move in accordance with various directions/velocities/angles. That is, the PIP screen may not only move from the left side 11 to the right side 12, but also move toward a right upper side 13 or a right lower side 14 as shown in FIG. 4.

FIGS. 3 and 4 show the examples where the PIP screen 11 moves from the left side to the right sides 12, 13 and 14. However, the PIP screen may move in accordance with various directions/angles without limitation, and the moving path is not limited to straight/curved lines. The PIP screen 11 may rotate in a direction, may vary in size while moving, and may have an animation effect of gradually appearing and disappearing, flickering, etc.

Referring again to FIG. 2, the first storage 150 stores unlimited data under control of the first controller 170. The first storage 150 may include a nonvolatile memory, a volatile memory, a flash memory, a hard disk drive (HDD) or a solid state drive (SSD). The first storage 150 is accessed by the first controller 170, and performs reading/recording/modifying/deleting/updating/and the like with regard to data under control of the first controller 170.

The data stored in the first storage 150 may for example includes not only an operating system for driving the display apparatus 100, but also various applications, image data, additional data, etc. executable on this operating system.

In detail, the first storage 150 may store a signal or data input/output corresponding to operations of the respective elements 110 to 160 under control of the first controller 170. The first storage 150 may store a graphic user interface (GUI) related to a control program for controlling the first display apparatus 100 and an application provided by a manufacturer or downloaded from the outside, images for providing the GUI, user information, a document, a database, or related data.

The first storage 150 further stores various pieces of information including coordinate information for sensing a user's input on the touch screen and/or the touch sensor of the remote controller. For example, when the touch screen or the touch sensor senses a user's touch, the first controller 170 determines the kind of touch input sensed using the information previously stored in the first storage 150, calculates the coordinate information (X and Y coordinates) corresponding to the touched position, and transmits the calculated coordinate information to the first and second image processors 121 and 122. Further, an image corresponding to the determined kind of touch input and the touch position may be displayed on the display 120 by the first and second image processors 121 and 122.

According to an exemplary embodiment, the first storage 150 may further store information about the settings for the PIP moving mode. The first controller 170 may control a second image signal to be received in response to the execution of the PIP moving mode and displayed as the sub screen on the first display 130.

According to an exemplary embodiment, the term of 'storage' refers to the first storage 150, a read only memory (ROM) in the first controller 170, a random access memory (RAM), or a memory card (for example, a micro SD card, a memory stick, etc.) mounted to the first display apparatus 100.

The first communication interface 160 performs communication with other apparatuses. In this exemplary embodiment, the first communication interface 160 includes a serial communication module of USB, a cable, etc. by which data communication based on predetermined standards is possible, and transmits the movement information of the PIP screen based on the settings for the PIP moving mode to the external display apparatus, i.e., to the serially-connected second display apparatus 200. Further, the first communication interface 160 transmits the first and second image signals to the second display apparatus 200.

According to an exemplary embodiment, the first communication interface 160 may support at least one of communication interfaces 1 to N such as Bluetooth, Wi-Fi direct, radio frequency (RF), Zigbee, a wireless LAN, Wi-Fi, infrared communication, ultra wideband (UWB), near field communication (NFC), etc. According to an exemplary embodiment, the first communication interface 160 may further include at least one wired communication interface such as a wired LAN.

The first communication interface 160 in this exemplary embodiment may be built-in the main body of the first display apparatus 100, or may be achieved in the form of a dongle or a module detachably connected to a connector of the first display apparatus 100.

The first controller 170 performs control with regard to various elements of the first display apparatus 100. For example, the first controller 170 proceeds with the image processing process performed by the first and second image processors 121 and 122, performs control operations corresponding to commands from the first user interface 140, and performs an operation corresponding to a user's touch by sensing a control position corresponding to the user's touch on the touch screen or the touch sensor and setting up virtual points (X and Y coordinates) corresponding to the sensed control position, thereby controlling operations of the first display apparatus 100. For example, the first controller 170 may be achieved in the form of combining a central processing unit (CPU) with software.

The first controller 170 controls the operations of the first display apparatus 100 and signal flow between internal elements 110 to 160 of the first display apparatus 100, and processes data. Also, if there is a user's input or if a set and stored condition is satisfied, the first controller 170 may perform an operating system (OS) and various applications stored in the storage 150.

The first controller 170 controls the first and second image receivers 111 and 112 to receive the first and second image signals in response to a user's input, e.g., channel selection received through the first user interface 140, and controls the first and second image processors 121 and 122 to process the received first and second image signals. The first image corresponding to the first image signal processed by the first image processor 121 is displayed as the main screen on the first display 130, and the second image corresponding to the second image signal processed by the second image processor 122 is displayed as the sub screen (i.e., the PIP screen) on the first display 130. Under control of the controller 170, the second image processor 122 determines the size and resolution of the PIP screen, and determines when, where and which angle and direction the output second image appears and is displayed.

For convenience of the description, the first image is displayed on the main screen and the second image is displayed on the sub screen. However, without limitation, the second image may be displayed on the main screen and the first image may be displayed on the sub screen. Alternatively, the displayed images may be exchanged between the main screen and the sub screen.

Based on the information about the settings for the PIP screen displayed as the sub screen on the first display 130, the first controller 170 controls the first display 130 to display the PIP screen 11 moving in a preset velocity/direction, and controls the first communication interface 160 to transmit the movement information about the moving PIP screen to an adjacent external display apparatus, i.e., a serially-connected second display apparatus 200. Further, the first controller 170 may control the first communication interface 160 to transmit the first and second image signals to the second display apparatus 200.

The first controller 170 determines whether the second display apparatus 200 operates in the same mode as the first display apparatus 100, i.e., in the PIP moving mode. When the second display apparatus 200 operates in the PIP moving mode, the first controller 170 transmits the movement information/the image signal of the PIP screen to the second display apparatus 200.

On the other hand, if the second display apparatus 200 does not operate in the PIP moving mode, the movement information/the image signal of the PIP screen is not transmitted and the movement of the PIP screen is finished in the first display 130.

Below, elements of the second display apparatus 200 of the multi display system 10 will be described in detail with reference to FIG. 5.

Figure 5:
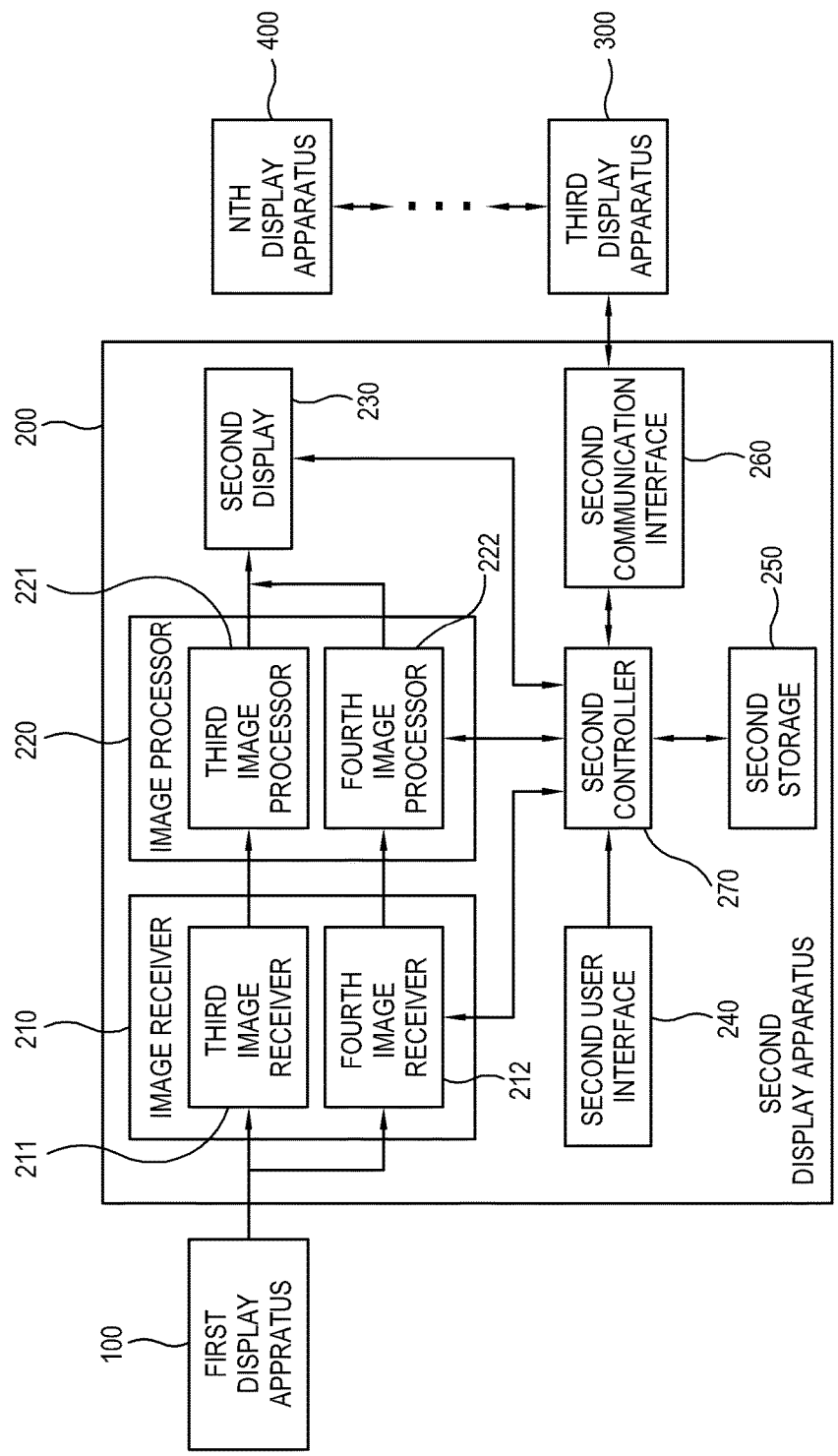
FIG. 5 is a block diagram of a display apparatus according to another exemplary embodiment.

FIG. 5 is a block diagram of a display apparatus according to another exemplary embodiment.

As shown in FIG. 5, the second display apparatus 200 according to an exemplary embodiment includes third and fourth image receivers 211 and 212 configured to receive image signals from the exterior, and third and fourth image processors 221 and 222 configured to respectively process the first and second image signals received from the third and fourth image receivers 211 and 212. The display apparatus 200 further includes a second display 230 configured to display the first and second image signals processed by the third and fourth image processors 221 and 222 as third and fourth images, respectively, and a second user interface 240 configured to receive a user's input. The display apparatus 200 further includes a second storage 250 configured to store various pieces of data, and a second communication interface 260 configured to perform wired/wireless communication with the exterior. The display apparatus 200 further includes a second controller 270 configured to control the second display apparatus 200.

In the second display apparatus 200 shown in FIG. 5, elements having the same functions as those of the first display apparatus 100 shown in FIG. 2 are referenced by like numerals and terms. Thus, the descriptions of the elements in the first display apparatus 100 are also applied to these elements of the second display apparatus 200. That is, the descriptions of the first and second image receivers 111 and 112, the first and second image processors 121 and 122, the first display 130, the first user interface 140, the first storage 150, the first communication interface 160 and the first controller 170 are also applied to the third and fourth image receivers 211 and 212, the third and fourth image processors 221 and 222, the second display 230, the second user interface 240, the second storage 250 and the second communication interface 260, the second controller 270 of the second display apparatus 230. Thus, repetitive descriptions will be avoided. Although it is not illustrated in the drawings, the descriptions of the elements shown in FIG. 2 and FIG. 5 may be applied to the like elements of the third and fourth display apparatuses 300 and 400.

As shown in FIG. 5, an image receiver 210 of the second display apparatus 200 according to an exemplary embodiment includes the two image receivers 211 and 212, and an image processor 220 of the second display apparatus 200 also includes the two image processors 221 and 222.

The first and second image receivers 211 and 212 may be achieved variously in accordance with the formats of the image signal and the types of the display apparatus 200.

According to an exemplary embodiment, the third image receiver 211 may receive the first image signal corresponding to a third image to be displayed as a main screen on the display 230, and the fourth image receiver 212 may receive the second image signal corresponding to a fourth image to be displayed as a sub screen, i.e., a PIP screen 21. The first and second image signals are received from the preceding first display apparatus 100 as shown in FIG. 5. The first image signal corresponds to the first image, and the second image signal corresponds to the second image.

The third and fourth image processors 221 and 222 perform various image processing processes previously set to the image signal. In this exemplary embodiment, the third and fourth image processors 221 and 222 individually process the first image signal received in the third image receiver 211, and the second image signal received in the fourth image receiver 212, respectively.

The image signals processed in the third and fourth image processors 221 and 222 are output to the second display 230, so that a third image (i.e., video 3) corresponding to the first image signal can be displayed on the main screen of the second display 230, and a fourth image (i.e., video 4) corresponding to the second image signal can be displayed on a sub screen, i.e., the second PIP screen 21 having a preset size and overlapping with the third image by at least a partial area.

The second display apparatus 200 may display the PIP screen 21 moving in a preset velocity and a preset direction on the second display 230 in response to a user's input of selecting the PIP moving mode. Therefore, the PIP screen 21 may be displayed moving on the second display 230 like those of FIG. 3 and FIG. 4.

To this end, the second display apparatus 200 may generate an OSD for selecting and/or setting the PIP moving mode of moving the second PIP screen 21 in a predetermined velocity and a predetermined direction, and display the OSD on the second display 230.

The second user interface 240 transmits various preset control commands or unlimited information to the second controller 270 in response to a user's control and/or input. A user may change settings of the PIP moving mode through the second user interface 240. That is, the second display 230 displays an OSD showing menu items for settings of the PIP moving mode, and a user sets position information about the velocity, direction, angle, etc. of the PIP screen and information about reproduction of the fourth image to be displayed on the PIP screen through the displayed OSD. The angle may be involved in the direction.

The menu items displayed as the OSD may be achieved in various forms, as described above in relation to the first display apparatus 100.

A user may control the second user interface 240 so that the second display apparatus 200 can enter the PIP moving mode. In response to a user's selection, the second controller 270 controls the second PIP screen 21 to appear, move, and disappear on the second display 130 in accordance with preset settings for the PIP moving mode.

The second storage 250 stores unlimited data under control of the second controller 270. According to an exemplary embodiment, the second storage 250 may store information about settings for the PIP moving mode. The second controller 270 may perform control so that the second image signal can be received in response to execution of the PIP moving mode and displayed as the sub screen on the second display 230.

The second communication interface 260 performs communication with other apparatuses. In this exemplary embodiment, the second communication interface 260 includes a serial communication module of USB, a cable, etc. by which data communication based on predetermined standards is possible, and transmits and receives the movement information of the PIP screen based on the settings for the PIP moving mode to the adjacent external display apparatus. Further, the second communication interface 260 may perform at least one of transmitting and receiving the movement information of the PIP screen to and from the external display apparatus through the second communication interface 260.

In detail, the second communication interface 260 may receive the movement information of the first PIP screen 11 from the preceding first display apparatus 100 connected in series thereto, and transmit the movement information of the second PIP screen 21 to the following third display apparatus 300 connected in series thereto. In the multi display system 10 according to this exemplary embodiment, the movement information of the PIP screens 11, 21, 31 and 41 is transmitted in sequence as above, so that the PIP screens 11, 21, 31 and 41 can be displayed as if they are successively moving on the plurality of display apparatuses 100, 200, 300 and 400.

The second controller 270 performs control with regard to various elements of the second display apparatus 200. For example, the second controller 270 proceeds with the image processing process performed by the third and fourth image processors 221 and 222, and performs control operations corresponding to commands from the second user interface 240, thereby controlling operations of the second display apparatus 200.

The second controller 270 controls the third and fourth image receivers 211 and 212 to receive the first and second image signal, and controls the third and fourth image processors 221 and 222 to process the received first and second image signals. The third image corresponding to the first image signal processed by the third image processor 221 is displayed as the main screen on the second display 230, and the fourth image corresponding to the second image signal processed by the fourth image processor 222 is displayed as the sub screen on the second display 230.

The second controller 270 calculates setting values corresponding to points of time to make the second PIP screen 21 appear/move/disappear and its moving velocity/direction/angle, and setting values corresponding to points of reproduction time (starting/finishing time) to reproduce the fourth image, based on the movement information of the PIP screen received from the first display apparatus 100. The second controller 270 determines the setting values so that the second PIP screen 21 can be displayed as a screen continued from the first PIP screen 11. In accordance with calculation results, the second PIP screen 21 may be controlled to appear, move, and disappear with a predetermined time lag from the first PIP screen 11.

Figure 6:
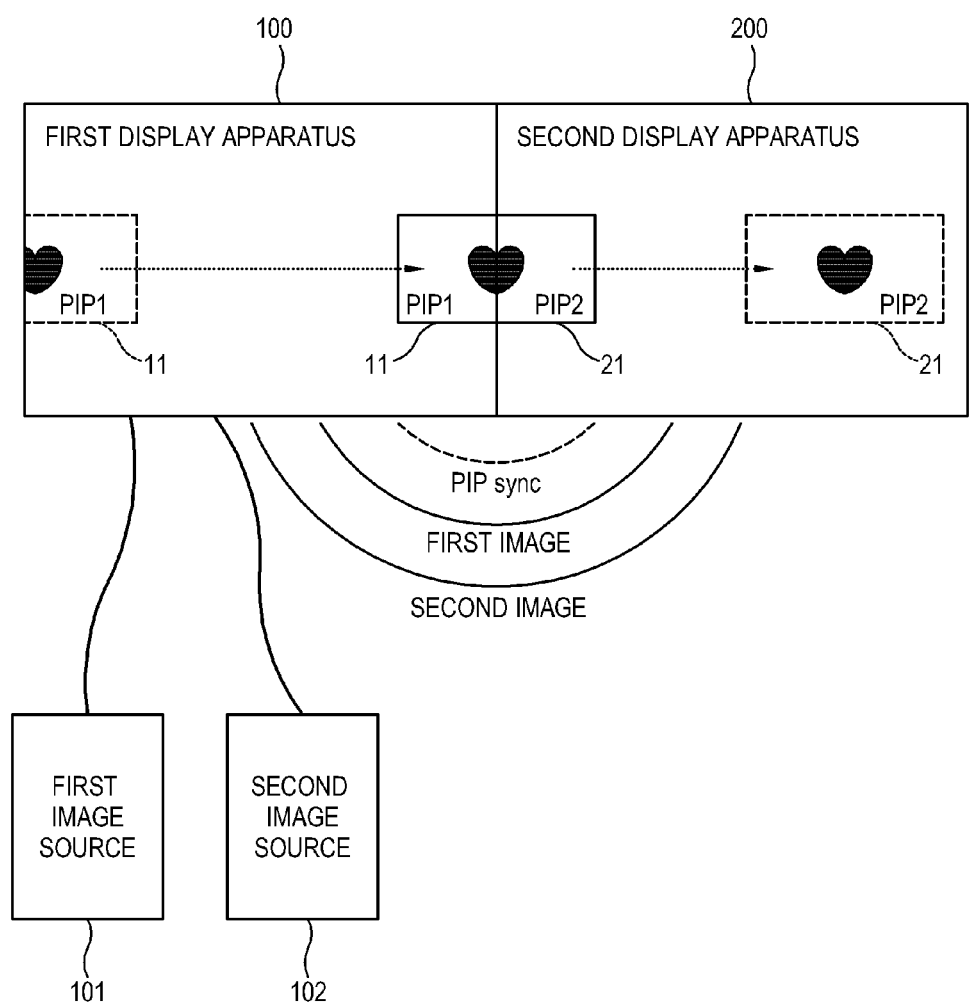
FIG. 6 is a diagram of a PIP screen that is successively moved in a plurality of display apparatuses of a multi display system according to the exemplary embodiments of FIGS. 2 and 5.

FIG. 6 is a diagram of a PIP screen that is successively moved in a plurality of display apparatuses of a multi display system according to the exemplary embodiments of FIGS. 2 and 5.

As described in the exemplary embodiment of FIG. 2 and FIG. 5, the movement information of the PIP screen and the image signal are transmitted from the first display apparatus 100 to the second display apparatus 200.

Therefore, as shown in FIG. 6, the first PIP screen 11 and the second PIP screen 21 are displayed as if they are consecutively moved. Further, the second image of the second PIP screen 21 is displayed following the second image of the first PIP screen 11.

As a result, the exemplary embodiment of FIG. 6 shows one PIP screen is displayed as if it moves from the left of the first display 130 to the right of the second display 230.

Referring again to FIG. 5, the second controller 270 controls the second communication interface 260 to transmit the movement information of the moving second PIP screen 21 to the adjacent external display apparatus. i.e., the serially-connected third display apparatus 300. Further, the second controller 270 controls the second communication interface 260 to receive the first and second image signals from the first display apparatus 200 and transmit them to the third display apparatus 300 in the same manner.

Thus, like that shown in FIG. 1, the third display apparatus 300 can display the moving third PIP screen 31 continued from the second PIP screen 21.

The second controller 270 determines whether the third display apparatus 300 operates in the same mode as those of the first and second display apparatuses 100 and 200, i.e., operates in the PIP moving mode. When the third display apparatus 300 operates in the PIP moving mode, the movement information/the image signal of the PIP screen is transmitted to the third display apparatus 300.

If the third display apparatus 300 does not operate in the PIP moving mode, the movement information/the image signal of the PIP screen is not transmitted and the movement of the PIP screen is finished in the second display 230.

Further, the multi display system 10 according to an exemplary embodiment may transmit the movement information about the PIP screen of the last nth display apparatus 400 to the initial/first display apparatus 100. In this case, the first PIP screen 11 is displayed moving in succession to the PIP screen 41 of the nth display apparatus 400, so that the PIP screens 11, 21, 31 and 41 can continuously and repetitively circulate among the display apparatuses 100, 200, 300 and 400. The nth display apparatus 400 is serially connected to the first display apparatus 100, thereby transmitting the movement information of the PIP screen 41.

In this exemplary embodiment, the circulation/repetition of the PIP screens 11, 21, 31 and 41 will be called a PIP circulating mode, and this circulating mode is selectable while setting up the PIP moving mode.

Figure 7:
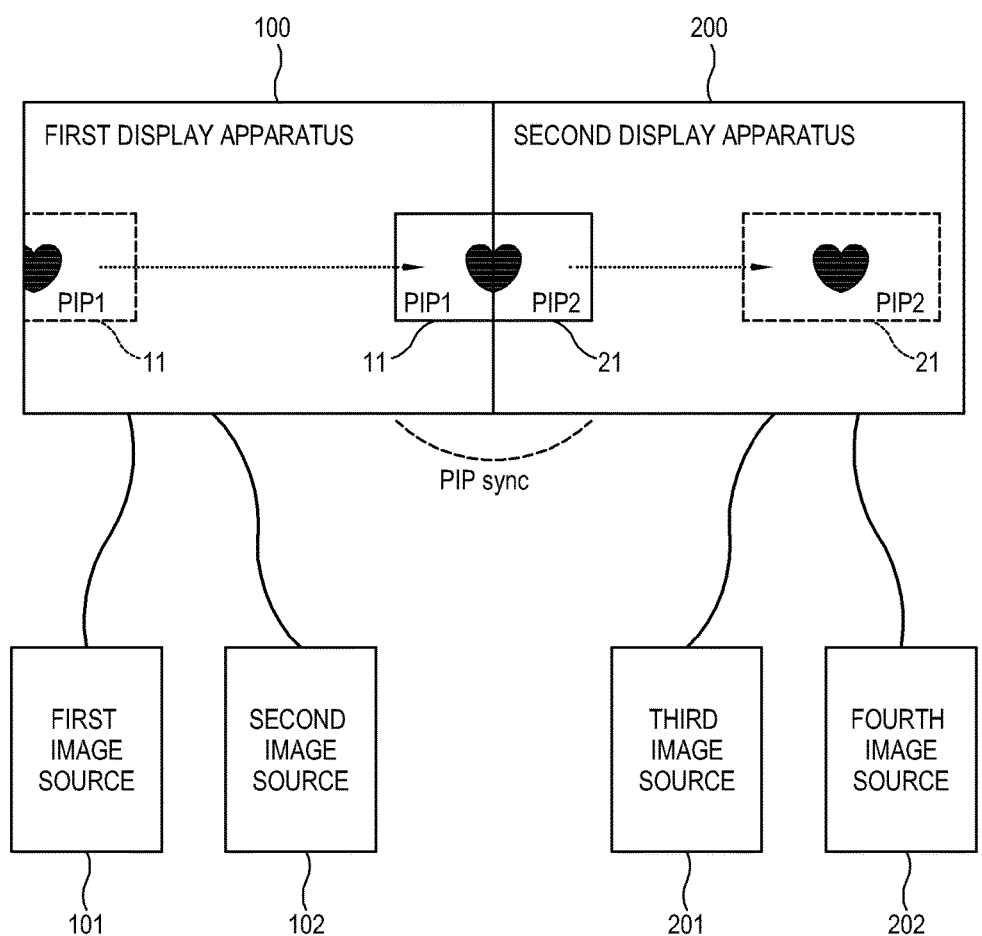
FIG. 7 is a diagram of a PIP screen that is successively moved in a plurality of display apparatuses of a multi display system according to another exemplary embodiment.
Figure 8:
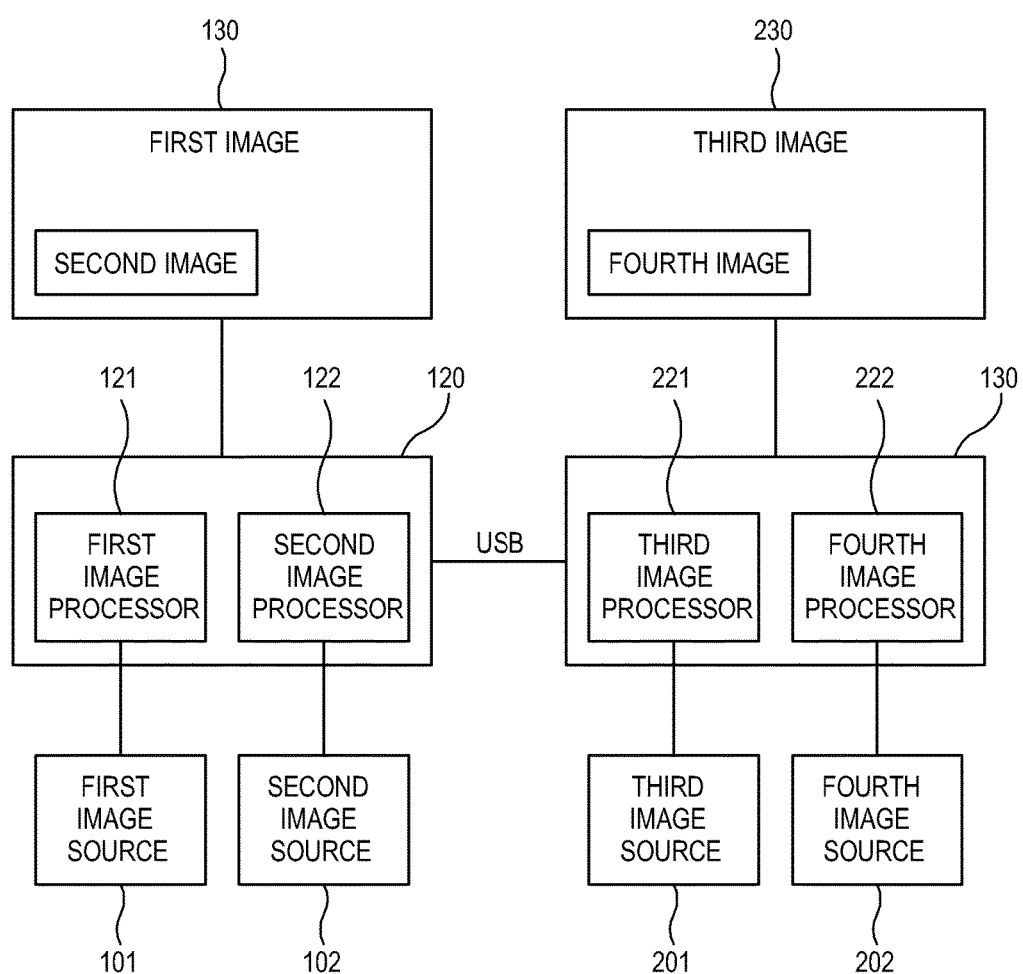
FIG. 8 is a schematic block diagram of the multi display system of FIG. 7.

FIG. 7 is a diagram of a PIP screen that is successively moved in a plurality of display apparatuses of a multi display system according to another exemplary embodiment, and FIG. 8 is a schematic block diagram of the multi display system of FIG. 7.

The exemplary embodiment shown in FIG. 7 is related to multi image sources and different from the exemplary embodiment shown in FIG. 6 in that the second display apparatus 200 receives image signals from independent third and fourth image sources 201 and 202.

The second display apparatus 200 receives the third image signal corresponding to the main screen from the third image source 201, and receives the fourth image signal corresponding to the sub screen from the fourth image source 202. The third image signal may correspond to the first image signal, and the fourth image signal may correspond to the second image signal. For example, if the first and second display apparatuses 100 and 200 are TVs, they are tuned to a channel-10 and a channel-13, and display a broadcasting signal of the channel-10 on their main screens and a broadcasting signal of the channel-13 on their sub screens.

In the foregoing exemplary embodiment, the third image signal corresponds to the first image signal, and the fourth image signal corresponds to the second image signal, but not limited thereto. Alternatively, the second image signal and the fourth image signal may be different from each other. In this alternative case, the first PIP screen 11 and the second PIP screen 21 are successively moved, but the second image and the fourth image are different from each other.

Even in the exemplary embodiments of FIG. 7 and FIG. 8, the movement information of the PIP screen is transmitted from the first display apparatus 100 to the second display apparatus 200.

Therefore, as shown in FIG. 7, the first PIP screen 11 and the second PIP screen 21 are displayed as if they are consecutively moved. Further, the second image of the first PIP screen 11 is displayed following the fourth image of the second PIP screen 21.

Thus, even in the exemplary embodiments of FIG. 7 and FIG. 8, one PIP screen is displayed as if it moves from the left of the first display 130 to the right of the second display 230.

Referring again to FIG. 5, the second display apparatus 200 may transmit the movement information of the moving second PIP screen 21 to the adjacent external display apparatus, i.e., the serially-connected third display apparatus 300. The third display apparatus 300 may also receive an image signal from an independent image source.

The second controller 270 determines whether the third display apparatus 300 operates in the same mode as those of the first and second display apparatuses 100 and 200, i.e., operates in the PIP moving mode. If the third display apparatus 300 operates in the PIP moving mode, the movement information of the PIP screen is transmitted to the third display apparatus 300.

In FIG. 6 and FIG. 7, only the PIP screens 11 and 12 displayed moving between the first and second display apparatuses 100 and 200 are illustrated by way of example for convenience of description. However, without limitation, the PIP screen may be successively moved and displayed even among other display apparatuses, e.g., not only the third display apparatus 300 but also the last display apparatus 400.

Referring again to FIG. 5, according to an exemplary embodiment, the multi display system 10 may further include a host apparatus H capable of setting up the PIP moving modes of the plurality of display apparatuses 100, 200, 300 and 400.

FIG. 9 is a diagram of a multi display system additionally including a host apparatus according to an exemplary embodiment.

As shown in FIG. 9, the display apparatuses 100, 200, 300 and 400 included in the display system 10 are connected to one another for wired/wireless communication, and are also sequentially connected in series from the first display apparatus 100 to the final nth display apparatus 400 by the USB or the like data line.

The host apparatus H is connected to one among the plurality of display apparatuses 100, 200, 300 and 400, for example, the first display apparatus 100, or may be configured to perform wired or wireless communication with all the plurality of display apparatuses 100, 200, 300 and 400. In the latter case, the movement information of the PIP screen may be exchanged not between the adjacent display apparatuses but between the host apparatus H and each of the display apparatuses 100, 200, 300 and 400.

A user may use the host apparatus H to set up the PIP moving modes for the plurality of display apparatuses 100, 200, 300 and 400, and select the PIP moving mode in accordance with the corresponding setting values.

In response to execution of the PIP function, each of the display apparatuses 100, 200, 300 and 400 displays images of the PIP screens 11, 21, 31 and 41 corresponding to the sub screens to be overlapped on an area of an image displayed on the main screen.

In the plurality of display apparatuses 100, 200, 300 and 400, the PIP screens 11, 21, 31 and 41 may be displayed moving in a preset direction and velocity. As shown in FIG. 9, the PIP screens 11, 21, 31 and 41 are displayed consecutively moving among the display apparatuses 100, 200, 300 and 400 connected in sequence, and their images are also reproduced in succession to the image of the previous PIP screen. Further, the PIP screen 11 of the first display apparatus 100 may be reproduced moving in succession to the PIP screen 41 of the last display apparatus 400.

To this end, in the multi display system 10, the movement information of the PIP screen (e.g., information about a velocity, direction and angle of a moving PIP screen) and reproduction information of an image displayed on the PIP screen (e.g., information about reproduction timing) is sent to the next serially-connected display apparatus or the host apparatus H, and thus PIP synchronization is performed among the display apparatuses 100, 200, 300 and 400.

The host apparatus H transmits the received movement information to another apparatus so that the movement information of the PIP screen can be shared between the host apparatus H and the plurality of display apparatuses 100, 200, 300 and 400. Thus, the PIP screens 11, 21, 31 and 41 are successively moved reproducing their images on the whole display formed by the plurality of display apparatuses 100, 200, 300 and 400 that constitute a video wall.

In the exemplary embodiment of FIG. 9, the host apparatus H may serve as an image supplier. That is, image signals corresponding to images to be displayed on the main screen and the sub screen are transmitted from the host apparatus H to the first display apparatus 100, and then these image signals are sequentially transmitted from the first display apparatus 100 to the other display apparatuses 200, 300 and 400, or the image signals to be displayed on the main and sub screens are transmitted from the host apparatus H to each of the plurality of display apparatuses 100, 200, 300 and 400.

Below, a control method of a multi display system according to an exemplary embodiment will be described with reference to FIG. 10.

FIG. 10 is a flowchart of a control method of a multi display system according to an exemplary embodiment.

As shown in FIG. 10, the plurality of display apparatuses 100, 200, 300, . . . , and 400 are set with regard to a PIP moving mode (S501, S502, S503). A user may set the PIP moving mode for each of the display apparatuses 100, 200, 300 and 400 in such a manner that setting values are input on the OSDs displayed on the displays 130 and 230 through the user interfaces 140 and 240. In detail, the user may input setting values t1, v1, and a1 respectively corresponding to time, velocity, and angle at operation S501, may input setting values t2, v2, and a2 respectively corresponding to time, velocity, and angle at operation S502, and may input setting values tn, vn, and an respectively corresponding to time, velocity, and angle at operation S503. Angle information may be involved in direction information.

Further, the first display apparatus 100 enters the PIP moving mode, and displays a moving PIP screen 1 (or 11) (S504). In detail, the first controller 170 executes the PIP moving mode in response to a user's control using the first user interface 140, and controls the first display 130 to display the PIP screen PIP1 (or 11) moving in the velocity and a direction corresponding to the values t1, v1 and a1 set in the operation S501.

Next, the first controller 170 determines whether the second display apparatus 200 connected in series with the first display apparatus 100 operates in the PIP moving mode (S505).

In the operation S505, when the serially-connected second display apparatus 200 operates in the PIP moving mode, the first controller 170 transmits movement information of the first PIP screen PIP1 (or 11) to the second display apparatus 200 through the first communication interface 160 (S506). The movement information of the first PIP screen 11 may include information about the velocity, the direction, and/or an angle (t1, v1, a1) of the PIP screen 11 moving within the first display 130, and information about reproduction of a second image to be displayed on the first PIP screen 11.

In the other display apparatuses 200, 300, . . . , and 400, the PIP screen is moved and the movement information is transmitted like the operations S504 to S506.

That is, the second display apparatus 200 enters the PIP moving mode in response to a user's control using the second user interface 240, and displays a moving PIP screen PIP2 (or 12) (S507). In detail, the second controller 270 controls the second display 230 to display the PIP screen PIP2 (or 21) moving in a predetermined velocity and a predetermined direction (e.g., t1+t2, v1+v2, a1+a2) based on the setting values t2, v2 and a2 set in the operation S502 and/or the movement information t1, v1 and a1 received in the operation S506.

Next, the second controller 270 determines whether the third display apparatus 300 connected in series with the first display apparatus 100 operates in the PIP moving mode (S508).

In the operation S508, when the serially-connected third display apparatus 300 operates in the PIP moving mode, the second controller 270 transmits movement information of the second PIP screen PIP2 (or 21) to the third display apparatus 300 through the second communication interface 260 (S509). The movement information of the second PIP screen 21 may include information about the velocity, the direction, and/or an angle (t2=t1+t2, v2=v1+v2, a2=a1+a2) of the PIP screen 21 moving within the second display 230, and information about reproduction of a second image displayed on the second PIP screen 21.

Such movement of the PIP screen and the transmission of the movement information are carried out up to the nth display apparatus.

Likewise, the nth display apparatus enters the PIP moving mode in response to a user's control, and displays a moving PIP screen PIPn (S510). In detail, the nth display apparatus controls an nth display to display the PIP screen PIPn moving in a predetermined velocity and a predetermined direction (e.g., tn−1+tn, vn−1+vn, an−1+an) based on the values (tn, vn, an) set in the operation S503 and/or movement information (tn−1, vn−1, an−1) received from a previous (n−1)th display apparatus.

Next, the nth display apparatus determines whether a serially-connected (n+1)th display apparatus operates in the PIP moving mode (S511).

In the operation S511, when the serially-connected (n+1) th display apparatus operates in the PIP moving mode, movement information of the PIP screen PIPn is transmitted to the (n+1)th display apparatus (S512). The movement information of the PIP screen PIPn may include information about the velocity, the direction and/or an angle (tn=tn−1+tn, vn=vn−1+vn, an=an−1+an) of the moving PIP screen PIPn, and information about reproduction of the image displayed on the PIP screen PINn.

In this exemplary embodiment, when the corresponding display apparatus determines in the operation S505, S508, or S511 that the following display apparatus does not operate in the PIP moving mode, the corresponding display apparatus determines whether the corresponding display apparatus is the last display apparatus (S513). When the corresponding display apparatus is the last display apparatus, the corresponding apparatus determines whether a PIP circulating mode is selected (S514).

When the PIP circulating mode is selected, the movement information of the PIP screen PIPn of the last display apparatus is transmitted to the first display apparatus 100

(S515), so that the PIP screen can be circularly/repetitively displayed among the plurality of display apparatuses.

On the other hand, if the corresponding display apparatus is not the last display apparatus or the PIP circulating mode is not selected, the movement information of the PIP screen PIPn of the last display apparatus is not transferred, and the method based on the PIP moving mode ends.

According to an exemplary embodiment, movement information of a PIP screen is shared among the plurality of display apparatuses 100, 200, 300 and 400 connected in a daisy chain, and therefore images are reproduced on the PIP screens 11, 21, 31 and 41 successively moving in the whole multi display system 10. Accordingly, the PIP screens are displayed as if they are successively moving among the plurality of display apparatuses 100, 200, 300 and 400, and thus are utilizable for various fields such as an advertisement image using a video wall. Further, the images of the PIP screens are successively reproduced among the plurality of display apparatuses 100, 200, 300 and 400, thereby attracting more attention.

In addition, the exemplary embodiments may also be implemented through computer-readable code and/or instructions on a medium, e.g., a non-transitory computer-readable medium, to control at least one processing element to implement any above-described embodiments. The medium may correspond to any medium or media which may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a display configured to display a first image corresponding to a first image signal on a main screen, and a second image corresponding to a second image signal on a picture in picture (PIP) screen overlapping an area of the main screen;
   a communication interface configured to transmit and receive information of a movement of the PIP screen, to and from another display apparatus connected to the display apparatus; and
   a controller configured to control the display to display the PIP screen based on the information,
   wherein the other display apparatus is configured to:
   display a third image on another main screen, and a fourth image on another PIP screen overlapping an area of the other main screen;
   receive the information from the display apparatus; and
   control to display the other PIP screen based on the information.

2. The display apparatus according to claim 1, wherein the controller is further configured to control the display to display the PIP screen based on the information received from the other display apparatus.

3. The display apparatus according to claim 1, wherein the information comprises at least one among a velocity, a direction, and an angle of the movement of the PIP screen.

4. The display apparatus according to claim 1, wherein the communication interface is further configured to transmit and receive information of the second image to and from the other display apparatus.

5. The display apparatus according to claim 4, wherein the information of the second image comprises information about reproduction of the second image so that an image on the other PIP screen in the other display apparatus can be reproduced in succession to the second image based on the information about the reproduction of the second image.

6. The display apparatus according to claim 1, further comprising a user interface configured to receive a selection of a PIP moving mode,
   wherein the controller is further configured to control the display so that the PIP screen appears, displays to be moved, and disappears based on settings for the selected PIP moving mode.

7. The display apparatus according to claim 6, wherein the controller is further configured to control the display to display a menu for setting the settings, and
   the user interface is further configured to receive the settings.

8. The display apparatus according to claim 6, wherein the controller is further configured to determine whether the other display apparatus operates in the PIP moving mode, and
   the communication interface is further configured to transmit the information to the other display apparatus in response to the controller determining that the other display apparatus operates in the PIP moving mode.

9. The display apparatus according to claim 1, wherein the communication interface is further configured to transmit and receive the first image signal and the second image signal to and from the other display apparatus.

10. The display apparatus according to claim 1, wherein the controller is further configured to control the display to display the PIP screen to be moved based on the information and/or settings for the movement of the PIP screen.

11. A multi display system comprising:
    a first display apparatus; and
    a second display apparatus connected to the first display apparatus,
    the first display apparatus comprising
    a first display configured to display a first image corresponding to a first image signal on a first main screen, and a second image corresponding to a second image signal on a first picture in picture (PIP) screen overlapping an area of the first main screen,
    a first communication interface configured to transmit information of a movement of the first PIP screen to the second display apparatus, and
    a first controller configured to control the first display to display the first PIP screen based on the information, and the second display apparatus comprising
- a second display configured to display a third image on a second main screen, and a fourth image on a second PIP screen overlapping an area of the second main screen,
- a second communication interface configured to receive the information from the first display apparatus, and
- a second controller configured to control the second display to display the second PIP screen based on the information.

12. The multi display system according to claim 11, further comprising a third display apparatus connected to the second display apparatus,
- wherein the second communication interface is further configured to transmit information of a movement of the second PIP screen to the third display apparatus.

13. The multi display system according to claim 12, wherein the third display apparatus comprises:
- a third display configured to display a fifth image on a third main screen, and a sixth image on a third PIP screen overlapping an area of the third main screen;
- a third controller configured to determine whether the third display apparatus is a last display apparatus of the multi display system; and
- a third communication interface configured to transmit information of a movement of the third PIP screen to the first display apparatus in response to the third controller determining that the third display apparatus is the last display apparatus.

14. The multi display system according to claim 12, wherein the information of the movement of the second PIP screen comprises at least one among a velocity, a direction, and an angle of the movement of the second PIP screen.

15. The multi display system according to claim 14, wherein the information of the movement of the first PIP screen further comprises information about reproduction of the second image,
- wherein the second controller controls the second display so that the fourth image can be reproduced in succession to the second image based on the information about the reproduction of the second image.

16. The multi display system according to claim 12, wherein the second communication interface is further configured to transmit information of the fourth image to the third display apparatus.

17. The multi display system according to claim 11, wherein the second communication interface is further configured to receive information of the second image from the first display apparatus, and
- the second controller is further configured to control the second display to display the fourth image in succession to the second image based on the information of the second image.

18. The multi display system according to claim 11, wherein the first controller is further configured to determine whether the second display apparatus operates in a PIP moving mode, and
- the first communication interface is further configured to transmit the information to the second display apparatus in response to the first controller determining that the second display apparatus operates in the PIP moving mode.

19. The multi display system according to claim 11, wherein the first communication interface is further configured to transmit the first image signal and the second image signal to the second display apparatus, and the second display is further configured to display the third image corresponding to the first image signal and the fourth image corresponding to the second image signal.

20. A method of controlling a first display apparatus, the method comprising:
- displaying a first image corresponding to a first image signal on a main screen, and a second image corresponding to a second image signal on a picture in picture (PIP) screen overlapping an area of the main screen;
- transmitting information of a movement of the PIP screen, to a second display apparatus connected to the first display apparatus; and
- displaying the PIP screen based on the information,
- wherein the second display apparatus:
  - displays a third image on another main screen, and a fourth image on another PIP screen overlapping an area of the other main screen;
  - receives the information from the first display apparatus; and
  - displays the other PIP screen based on the information.

21. The method according claim 20, further comprising receiving other information of a movement of the other PIP screen from a third display apparatus connected to the first display apparatus,
- wherein the displaying the PIP screen comprises displaying the PIP screen to be moved based on the information and the other information.

22. The method according claim 21, wherein the other information comprises at least one among a velocity, a direction, and an angle of the movement of the other PIP screen.

23. The method according claim 21, further comprising receiving information of another image of the other PIP screen from the third display apparatus.

24. The method according claim 23, wherein the other information comprises information about reproduction of the other image so that the second image can be reproduced in succession to the other image based on the information about the reproduction of the other image.

25. The method according to claim 21, further comprising receiving the first image signal and the second image signal from the third display apparatus.

26. The method according to claim 20, further comprising:
- receiving a selection of a PIP moving mode; and
- displaying the PIP screen so that the PIP screen appears, displays to be moved, and disappears based on settings for the selected PIP moving mode.

27. The method according claim 26, further comprising:
- displaying a menu for setting the settings; and
- receiving the settings.

28. The method according claim 26, further comprising determining whether the second display apparatus operates in the PIP moving mode,
- wherein the transmitting comprises transmitting the information to the second display apparatus in response to the determining that the second display apparatus operates in the PIP moving mode.

29. The method according to claim 20, further comprising transmitting the first image signal and the second image signal to the second display apparatus.

30. A method of controlling a multi display system comprising a first display apparatus, and a second display apparatus connected to the first display apparatus, the method comprising:

displaying, by the first display apparatus, a first image corresponding to a first image signal on a first main screen, and a second image corresponding to a second image signal on a first picture in picture (PIP) screen overlapping an area of the first main screen;

transmitting, by the first display apparatus, information of a movement of the first PIP screen to the second display apparatus;

displaying, by the first display apparatus, the first PIP screen based on the information;

displaying, by the second display apparatus, a third image on a second main screen, and a fourth image on a second PIP screen overlapping an area of the second main screen;

receiving, by the second display apparatus, the information from the first display apparatus; and displaying, by the second display apparatus, the second PIP screen based on the information.

31. The method according to claim 30, further comprising transmitting, by the second display apparatus, information of a movement of the second PIP screen to a third display apparatus connected to the second display apparatus.

32. The method according to claim 31, further comprising:

displaying, by the third display apparatus, a fifth image on a third main screen, and a sixth image on a third PIP screen overlapping an area of the third main screen;

determining, by the third display apparatus, whether the third display apparatus is a last display apparatus of the multi display system; and transmitting, by the third display apparatus, information of a movement of the third PIP screen to the first display apparatus in response to the determining that the third display apparatus is the last display apparatus.

33. The method according to claim 31, wherein the information of the movement of the second PIP screen comprises at least one among a velocity, a direction, and an angle of the movement of the second PIP screen.

34. The method according to claim 33, wherein the information of the movement of the first PIP screen further comprises information about reproduction of the second image, the method further comprising: reproducing, by the second display apparatus, the fourth image in succession to the second image based on the information about the reproduction of the second image.

35. The method according to claim 31, further comprising transmitting, by the second display apparatus, information of the fourth image to the third display apparatus.

36. The method according to claim 30, further comprising receiving, by the second display apparatus, information of the second image from the first display apparatus, wherein the displaying, by the second display apparatus, comprises displaying, by the second display apparatus, the fourth image in succession to the second image based on the information of the second image.

37. The method according to claim 30, further comprising determining, by the first display apparatus, whether the second display apparatus operates in a PIP moving mode, wherein the transmitting, by the first display apparatus, comprises transmitting, by the first display apparatus, the information to the second display apparatus in response to the determining that the second display apparatus operates in the PIP moving mode.

38. The method according to claim 30, further comprising transmitting, by the first display apparatus, the first image signal and the second image signal to the second display apparatus, wherein the displaying, by the second display apparatus, comprises displaying, by the second display apparatus, the third image corresponding to the first image signal and the fourth image corresponding to the second image signal.

39. The method according to claim 30, wherein the displaying, by the second display apparatus, comprises displaying, by the second display apparatus, the second PIP screen to be moved based on the information and settings for a movement of the second PIP screen.

40. The method according to claim 30, further comprising:

determining, by the second display apparatus, whether the second display apparatus is a last display apparatus of the multi display system;

determining, by the second display apparatus, whether the multi display system is in a PIP circulating mode, in response to the determining that the second display apparatus is the last display apparatus; and transmitting, by the second display apparatus, information of a movement of the second PIP screen to the first display apparatus in response to the determining that the multi display system is in the PIP circulating mode.

* * * * *